(12) United States Patent  (10) Patent No.: US 9,202,096 B2
Oh et al.  (45) Date of Patent: Dec. 1, 2015

(54) DEVICE AND METHOD FOR CONDUCTING TRANSACTIONS

(71) Applicant: Samsung Electronics Co., Ltd., Gyeonggi-do (KR)

(72) Inventors: Sae-Ah Oh, Seoul (KR); Byung-In Yu, Seoul (KR); Bo-La Yoo, Gyeonggi-do (KR)

(73) Assignee: Samsung Electronics Co., Ltd., Yeongton-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/293,183

(22) Filed: Jun. 2, 2014

(65) Prior Publication Data

US 2015/0097036 A1   Apr. 9, 2015

(30) Foreign Application Priority Data

Oct. 7, 2013   (KR) .................. 10-2013-0119313

(51) Int. Cl.
*G06K 7/10* (2006.01)
*G06K 15/12* (2006.01)
*G06K 7/14* (2006.01)

(52) U.S. Cl.
CPC .................................... *G06K 7/1404* (2013.01)

(58) Field of Classification Search
USPC .................. 235/462.41, 462.24, 462.11, 375, 235/462.45, 470
See application file for complete search history.

(56) References Cited

U.S. PATENT DOCUMENTS

| 8,254,683 | B2 * | 8/2012 | Yamaguchi et al. .......... 382/181 |
| 8,282,002 | B2 | 10/2012 | Shams |
| 8,342,406 | B2 * | 1/2013 | Saunders et al. ......... 235/462.01 |
| 2010/0312630 | A1 * | 12/2010 | Krutchik et al. ........... 705/14.35 |
| 2011/0215146 | A1 | 9/2011 | Shams |
| 2012/0005105 | A1 * | 1/2012 | Beier et al. .................... 705/303 |
| 2012/0222055 | A1 * | 8/2012 | Schaefer et al. .................. 725/5 |
| 2014/0114855 | A1 * | 4/2014 | Bajaj et al. ...................... 705/44 |

* cited by examiner

*Primary Examiner* — Edwyn Labaze
(74) *Attorney, Agent, or Firm* — Cha & Reiter, LLC (57) ABSTRACT

An apparatus is provided including a camera; and a processing circuitry configured to: capture an image of a scanning device by using the camera; and output a first scannable item based on the captured image of the scanning device.

16 Claims, 8 Drawing Sheets

DEVICE AND METHOD FOR CONDUCTING TRANSACTIONS

CROSS-REFERENCE TO RELATED APPLICATION

This application claims the priority under 35 U.S.C. §119(a) to Korean Application Serial No. 10-2013-0119313, which was filed in the Korean Intellectual Property Office on Oct. 7, 2013, the entire content of which is hereby incorporated by reference.

TECHNICAL FIELD

The present disclosure relates to electronic devices, and more particularly to an interface for conducting transactions.

BACKGROUND

In general, when a payment is performed using a smart phone, payment identification information on barcodes, Quick Response Codes (QR codes), Near Field Communication Tags (NFC tags), and the like corresponding to various payment items such as a credit card, a membership card, and a coupon is displayed on a display unit.

If payment identification information is scanned by a scanning apparatus such as a Point-of-Sale (POS) apparatus, the scanned payment identification information is transmitted to a payment server. If the payment is approved by the payment server, a response informing that the payment is completed is transmitted to the smart phone so that the smart phone that receives the response can display a payment completion screen on the display unit.

For example, if the user wants to perform a payment with a membership card and a coupon, the user selects a payment item corresponding to a membership card among a plurality of payment items displayed on a display unit of a smart phone, and the smart phone displays payment identification information corresponding to the membership card selected by the user. If the payment identification information corresponding to the membership card is scanned by a POS apparatus, and the user selects a payment item corresponding to a coupon among the plurality of payment items displayed on the display unit of the smart phone and selects a kind of the payment identification information corresponding to the selected payment item, the smart phone displays the payment identification information corresponding to the coupon selected by the user. If the payment identification information corresponding to the coupon is scanned by the POS apparatus, the payment identification information on the scanned membership card and coupon is transmitted to the payment server. If the payment is approved by the payment server, a response informing that the payment is completed is transmitted, and the smart phone that receives the response can display a payment completion screen on the display unit.

As described above, in the conventional art, the user selects various payment items through a smart phone, and a payment is performed by scanning payment identification information corresponding to each of the selected payment items by the scanning apparatus. However, the need still exists for new techniques for presenting payment items as well as other scannable items.

SUMMARY

An apparatus is provided comprising a camera; and a processing circuitry configured to: capture an image of a scanning device by using the camera; and output a first scannable item based on the captured image of the scanning device.

According to another aspect of the disclosure, a method is provided comprising: capturing, by an electronic device, an image of a scanning device; and outputting, by the electronic device, a first scannable item based on the captured image of the scanning device.

According to yet another aspect of the disclosure, an apparatus is provided comprising a display screen and a processing circuitry configured to: detect an orientation of a scanning device relative to the display screen; and rotate a first barcode image displayed on the display screen based on the orientation of the scanning device relative to the display screen.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, specific exemplary aspects of the present disclosure will be described with reference to the accompanying drawings. It should be understood that the present disclosure is not limited or restricted by the exemplary aspects, and includes all the changes, equivalents, and substitutions included in the idea and technical scope of the present disclosure. The same reference numerals represented in each of the drawings indicate the elements that perform substantially the same functions.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. The terminology used in this application is for the purpose of describing particular aspects only and is not intended to be limiting of the disclosure. As used herein, the singular forms are intended to include the plural forms as well, unless the context clearly indicates otherwise.

As used throughout the disclosure, the term "scannable item" refers to item of information that can be scanned. Examples of scannable items include bar codes, Near-Field Communication (NFC) codes, and or any other suitable type of codes. In some implementations, a scannable item may encode an identifier for a transaction item. In the context of payment transactions, scannable items may encode credit card numbers, membership card numbers, and/or any suitable payment item identifiers.

The electronic apparatus of the present disclosure may include any apparatus provided with a display, and the electronic apparatus may be a portable apparatus, a mobile terminal, a communication terminal, a portable communication terminal, a portable mobile terminal, and the like.

For example, the electronic apparatus may be a smart phone, a cellular phone, a game console, a TV, a display apparatus, a vehicle head unit, a notebook computer, a laptop computer, a Tablet PC, a Personal Media Player (PMP), a Personal Digital Assistant (PDA), and the like. The electronic apparatus may be implemented by a pocket-sized portable communication terminal with a wireless communication function. Further, the electronic apparatus may be a flexible display apparatus. Additionally or alternatively, the present disclosure may be applied to any apparatus to which an image sensor can be provided.

A representative configuration of the electronic apparatus relates to a smart phone, and some elements may be omitted or changed from the representative configuration of the electronic apparatus.

Figure 1:
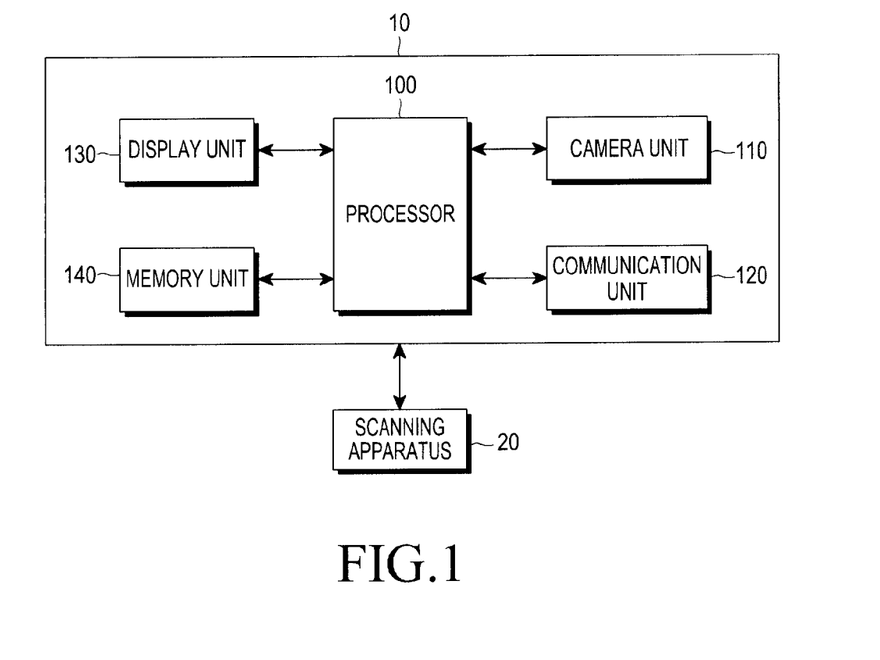
FIG. 1 is a block diagram of an example of an electronic apparatus according to an aspect of the present disclosure.

FIG. 1 is a block diagram of an example of an electronic apparatus according to an aspect of the present disclosure.

An electronic apparatus 10 according to the aspect of the present disclosure includes a processor 100, a camera unit 110, a communication unit 120, a display unit 130, and a memory unit 140.

The processor 100 may include any suitable type of processing circuitry, such as, for example, a processor (e.g., an ARM-based processor, a MIPS based processor, an x86-based processor), an Application Specific Integrated Circuit (ASIC), a Field Programmable Gate Array (FPGA), etc. In operation, the processor 100 controls the overall operation of the electronic apparatus 10, configures a payment item selection screen for selecting various payment items such as a credit card, a membership card, and a coupon, and displays the payment item selection screen on the display unit 130.

If one or more payment items on the display unit 130 are selected by the user, the processor 100 configures a payment screen including the one or more selected payment items, and displays the configured payment screen on the display unit 130.

Here, the processor 100 may configure the payment screen including the one or more selected payment items in three methods.

For example, according to one aspect of the disclosure, the processor 100 can generate one item of payment identification information in association with the one or more selected payment items, and configure a payment screen including the one generated item of the payment identification information. The payment identification information can then be scanned by the scanning apparatus 20 and the user can easily perform the payment.

According to another aspect of the disclosure, the processor 100 may configure a payment screen including detailed information regarding each of the one or more selected payment items. For example, the processor 100 may generate and display a payment screen including detailed information of a credit card including a card owner name, kind, benefits, payment identification information, and the like. Additionally or alternatively, as another example, the processor may generate and display a payment screen including detailed information of a membership card including the name, kind, benefits, payment identification information, and the like. Additionally or alternatively, as another example, the processor may generate and display a payment screen including detailed information of a coupon including the name, kind, benefits, payment identification information, and the like. When each of the displayed payment screens are dragged to the left or the right by an input means, such as a finger, the processor may convert the payment screen to display another payment screen in response to the drag direction.

Further, if the processor 100 recognizes a movement of a scanning apparatus 20 by the camera unit 110, and determines that the movement of the scanning apparatus 20 is an input for displaying another payment screen, the processor 100 may convert the payment screen to display the another payment screen. The configuration of displaying the payment screen is not limited to the aspects and can be configured in a varied manner.

According to another aspect of the disclosure, the processor 100 may configure one payment screen including payment identification information with respect to each of the one or more selected payment items. For example, if the size of the configured payment screen is larger than the size of the display unit 130, the processor 100 displays an area of the payment screen which corresponds to the size of the display unit 130, and the other areas of the payment screen which are not displayed can be displayed on the display unit 130 in response to the drag direction if the displayed payment screen is dragged by an input means in a vertical direction.

According to another aspect of the disclosure, the processor 100 may use the camera unit 110 to track the scanning apparatus 20. If the processor 100 recognizes the movement of the scanning apparatus 20 and determines that the recognized movement of the scanning apparatus 20 is an input for displaying the other areas of the payment screen which are not displayed on the display unit 130, the other areas of the payment screen can be displayed on the display unit 130. In that regard, in some implementations, the processor 100 may be configured to use image processing (and/or other techniques) to recognize input gestures that are performed by using a scanning apparatus.

When the payment identification information is scanned by the scanning apparatus 20 and the payment approval on the scanned payment identification information is performed by a payment server, the processor 100 receives a response that notifies of completion of the payment from the payment server. The response that notifies of the completion of the payment may include information of payment approval of the one or more selected payment items.

Afterwards, the processor 100 may generate a payment completion screen based on the received response and display the payment completion screen on the display unit 130.

The camera unit 110 may include one or more of a front camera and a rear camera. As indicated above, in some implementations, the camera unit 110 may be used to identify a kind, a position, and a movement of the scanning apparatus 20 by the processor.

The communication unit 120 performs communication between other electronic apparatuses, and may use various communication schemes. At this point, the various communication schemes may include wireless LAN, Bluetooth, infrared data association (IrDA), a WiFi-Direct communication, a Near Field Communication (NFC), and the like.

The display unit 130 may be implemented by a Liquid Crystal Display (LCD), and visually provides a menu, input data, function setting information, and other various information of the electronic apparatus 10 to the user. The display unit 130 may be implemented by various apparatuses other than the LCD. The display unit 130 performs a function of outputting a booting screen, a standby screen, a display screen, a communication screen, screens for other applications, and the like of the electronic apparatus 10. Further, the display unit 130 may be implemented by a touch panel and receive an input such as a touch or a drag of an input unit including a finger, a stylus pen, and the like.

The memory unit 140 may include any suitable type of volatile and non-volatile memory, such as a flash memory, a Solid State Drive (SSD), a Hard Drive (HD), a Read-Only Memory (ROM), a Random Access Memory (RAM), etc. The memory unit 140 may store an input or output signal or data in response to operations of the processor 100, the camera unit 110, the communication unit 120, and the display unit 130. Further, the memory unit 140 may store control programs or applications for controlling the electronic apparatus 10 or the processor 100.

Figure 2:
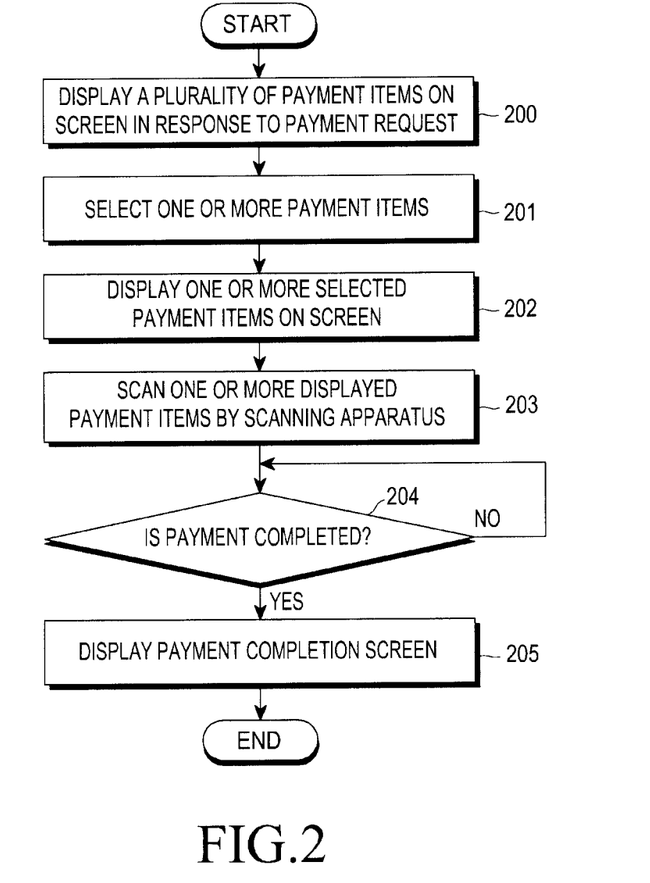
FIG. 2 is a flowchart of an example of a process for providing a user interface according to aspects of the disclosure.

FIG. 2 is a flowchart of an example of a process for providing a user interface according to aspects of the disclosure. According to the process, the processor 100 displays various payment items in response to a payment request on a screen in step 200. For example, the various payment items may include a credit card, a payment token, a membership card, a coupon, a ticket, and the like.

In step 201, one or more payment items are selected. In step 202, the processor 100 displays the one or more selected payment items on the display unit 130 in step 202. In other words, the processor 100 may generate a payment screen including information corresponding to the one or more selected payment items and display the payment screen on the display unit 130.

The user may install an application for downloading payment items on his or her own including a credit card, a small sum of mobile payment, a membership card, a coupon, a ticket, and the like and registering the downloaded payment items, on the electronic apparatus 10. If the user selects a payment item to be registered to the application, the processor 100 performs a control to register the selected payment item to the installed application, to group the plurality of registered payment items on a home screen of the electronic apparatus 10 according to each used place, and display the grouped payment items in an aligned manner. If the user selects an aligned payment item group, the processor 100 performs a control to display a payment screen in association with the selected payment item group on the display unit 130.

In step 203, the scanning apparatus 20 scans the payment identification information on the one or more displayed scannable items. In step 204, the processor 100 determines whether the payment is completed. If the payment is completed, a payment completion screen is displayed on the display unit 130 in step 205. Otherwise, if the payment is not completed, step 204 is repeated.

The payment identification information scanned by the scanning apparatus 20 is transmitted to a payment server. If the payment is approved by a payment server, the electronic apparatus 10 receives a response indicating that the payment is approved.

If the response indicating payment approval is received, the processor 100 may display a payment completion screen on the display unit 130.

Figure 3:
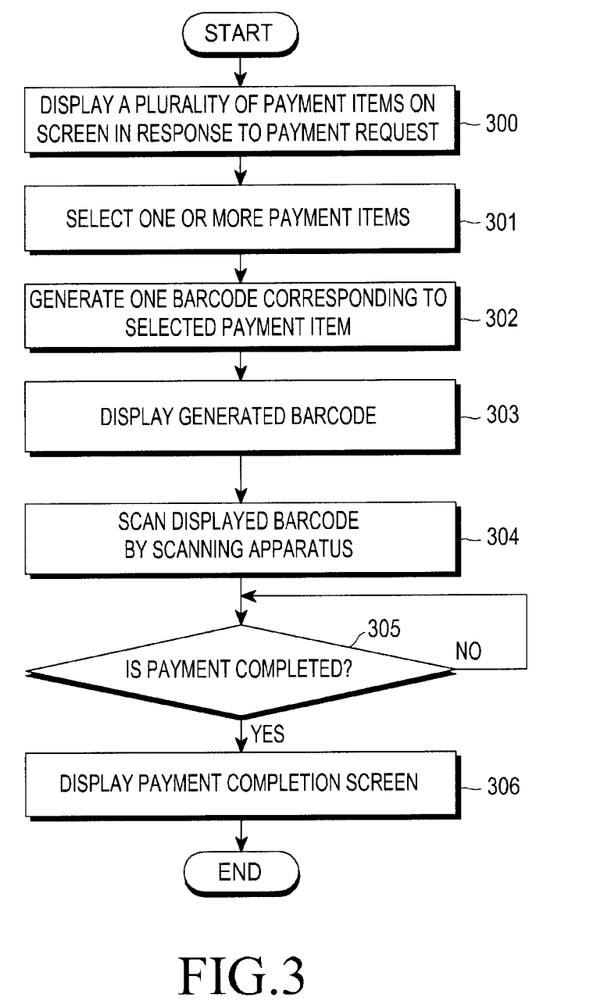
FIG. 3 is a flowchart of another example of a process of providing a user interface according to aspects of the disclosure.
Figure 4A:
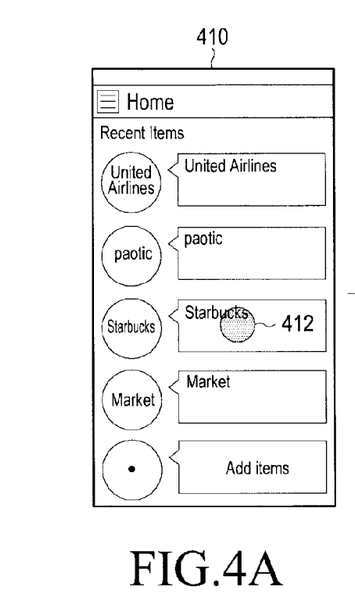
FIG. 4A, FIG. 4B, FIG. 4C and FIG. 4D are diagrams illustrating an example of a user interface according to aspects of the disclosure.
Figures 4B, 4C:
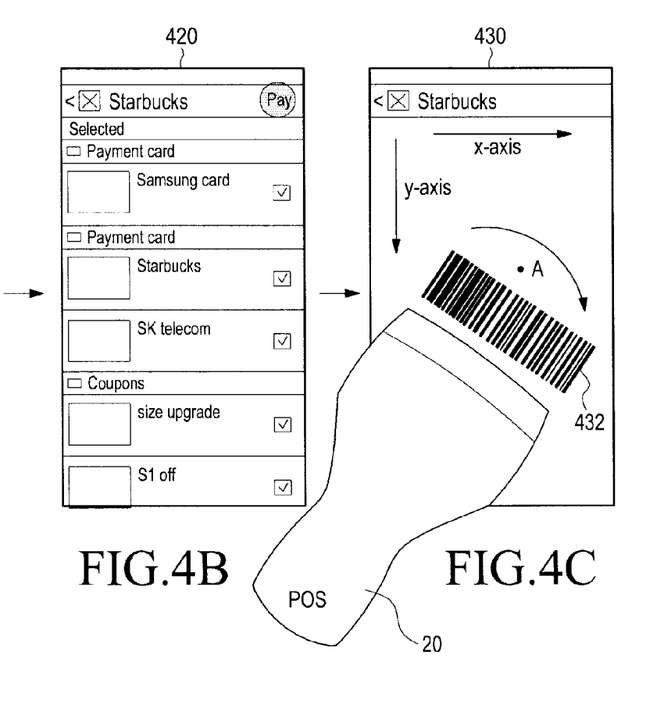
Figure 4D:
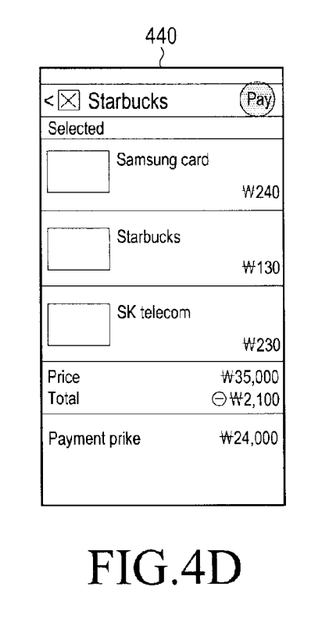

FIG. 3 is a flowchart of another example of a process of providing a user interface according to aspects of the disclosure. In step 300, the processor 100 displays a plurality of payment items in response to a payment request.

In step 301, one or more of the displayed payment items are selected by a user. In step 302, the processor 100 generates one barcode representing the one or more selected payment items. For example, a user ID and a payment token for a plurality of payment items (e.g., a credit card, a payment token, a membership card, a coupon, a ticket, and the like.) are encoded in the bar code. At this point, each of the selected payment items may be stored in the memory unit 140 in association with a user ID.

In step 303, the processor 100 displays the generated barcode(s) on the display unit 130. Any suitable type of bar code can be generated (e.g., a one-dimensional code, a two-dimensional code, QR barcode, linear barcode, etc.) Although in this example a bar code is generated, in another examples any other suitable type of scannable item may be generated, such as a QR code or an NFC tag.

Moreover, in some implementations, if one or more payment items are selected, the processor 100 may capture an image of the scanning apparatus 20 with the camera unit 110 and recognize a kind of the scanning apparatus 20 based on the captured image. Afterwards, the processor 100 may generate a scannable item (e.g., a bar code) based on the kind of the scanning apparatus. For example, if the scanning apparatus is a QR code scanner, the processor 100 may generate a QR code. As another example, if the scanning apparatus is a NFC tag reader, the processor 100 may generate an NFC tag.

Additionally or alternatively, in some implementations, the processor 100 may use captured image(s) of the scanning apparatus to detect at least one of a position or an orientation (e.g., tilt), of the scanning apparatus. Afterwards, the processor 100 may output (e.g., display) any generated barcode(s), or other types of code(s), based on a position or tilt of scanning apparatus. For example, if the displayed payment identification information is a barcode or a QR code, the processor 100 may display the barcode or the QR code by changing a position or a tilt of the barcode, or the QR code, on the display unit 130 in accordance with a position or a tilt of the recognized scanning apparatus 20.

In step 304, the scanning apparatus 20 scans the barcode displayed on the display unit 130. In step 305, the processor 100 determines whether the payment is completed. If the payment is completed, the payment completion screen is displayed on the display unit 130 in step 306. Otherwise, if the payment is not completed, the processor 100 continuously step 305 is repeated.

If a user ID associated with the scanned barcode is recognized by the scanning apparatus 20, the scanning apparatus 20 transmits the recognized user ID to a payment server of an associated card company, a telecommunication company, a membership issuance place, a coupon issuance place, and the like. If the payment server approves the payment, the processor 100 may receive an indication of payment approval from the payment server. Afterwards, the processor 100 may display a payment completion screen including payment details or discount details based on the indication of payment approval.

FIGS. 4A to 4D are diagrams illustrating an example of a user interface according to aspects of the disclosure. According to the example, the electronic apparatus 10 may display a list 410 of payment item groups. As illustrated, in this example, the payment item groups may correspond to different merchants, such as United Airlines™, Paotic, Starbucks™, and Market. Once the list 410 is displayed, a user input 412 (e.g., a touch input) may be received selecting one of the payment item groups. In response to the input, a list 420 of payment items in the selected group may be displayed. As illustrated, the payment items in the list 420 can be grouped according to type (e.g., payment card, coupon, membership card, etc.) After the list 420 is displayed, user input is received selecting one or more of the payment items. Following the selection of the one or more payment items, a bar code 432 (or another scannable item) corresponding to the selected payment item is displayed in screen 430. As illustrated, in this example, the bar code may encode identifiers for a credit card, member card, and/or coupons. Thus, multiple identifiers that are necessary for the completion of the transaction may be encoded in a single bar code (or another scannable item)

In some implementations, the position the bar code 432 on the screen (along the x-axis and/or y-axis of the screen) may be determined based on a position of the scanning apparatus 20 (e.g., position of the scanning apparatus 20 relative to the electronic apparatus 10.). Additionally or alternatively, in some implementations, the tilt (or rotation) of the bar code around an axis A, which is transverse to the display of electronic apparatus 10, may be determined based on an orientation of the scanning apparatus (e.g., orientation of the scanning apparatus 20 relative to the electronic apparatus 10). Additionally or alternatively, in some implementations, after the bar code is displayed the position or tilt of the bar code may be changed in accordance with changes in the position or tilt of the scanning apparatus 20. As noted above, in some implementations, the position and/or orientation may be determined by using the camera unit 110.

After the barcode 432 is scanned with the scanning apparatus 20, information encoded by the bar code 432 may be used to complete a transaction in which the user of the electronic apparatus 10 is partaking When the transaction is completed, the electronic apparatus 10 may display a payment completion screen 440 providing a summary of the transaction. As noted above, in some implementations, the information in the payment completion screen may be provided to the electronic apparatus 10 by a server that is used to complete the transaction.

Figure 5:
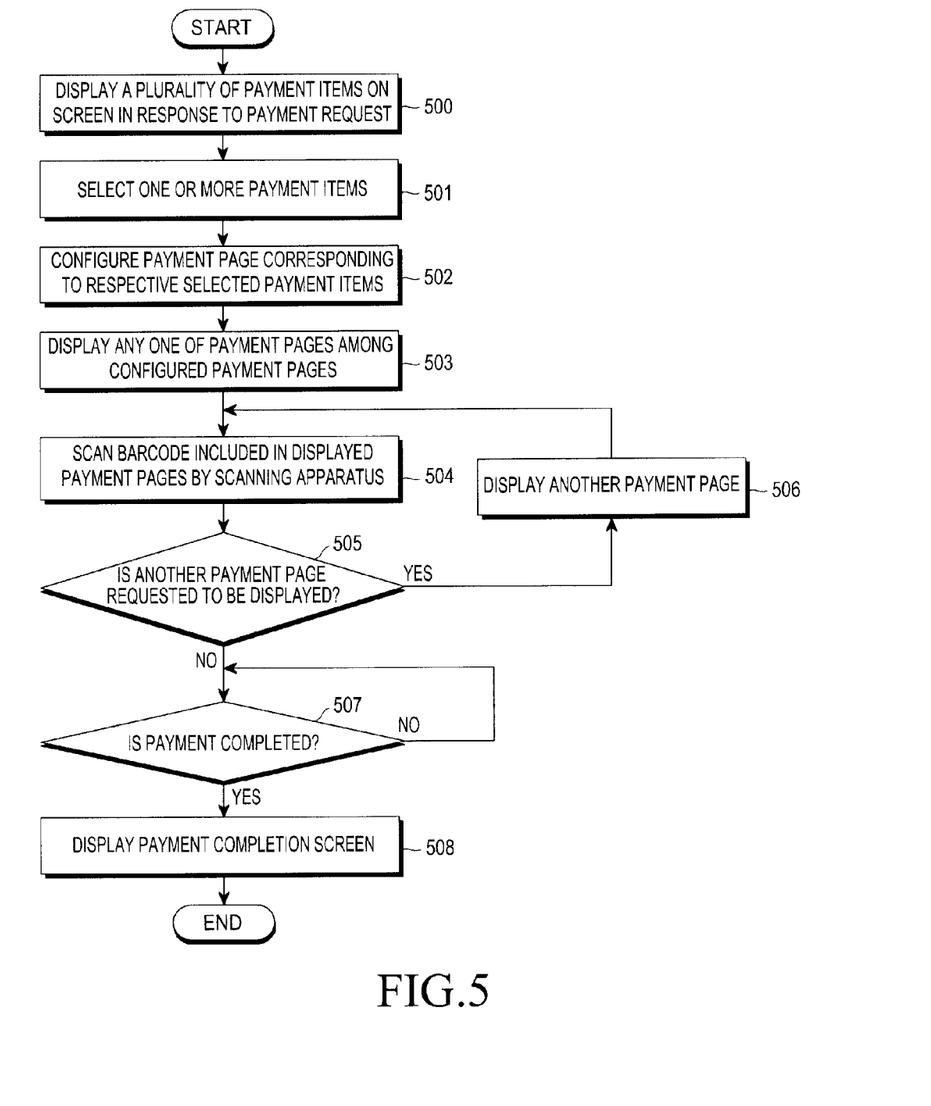
FIG. 5 is a flowchart of yet another example of a process for providing a user interface.
Figure 6A:
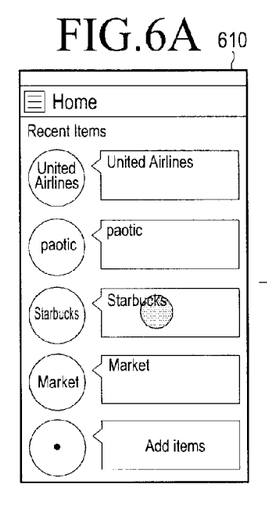
FIG. 6A, FIG. 6B, FIG. 6C and FIG. 6D are diagrams illustrating another example of a user interface according to aspects of the present disclosure.
Figure 6B:
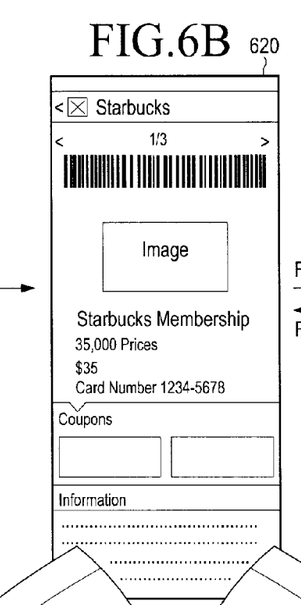
Figure 6C:
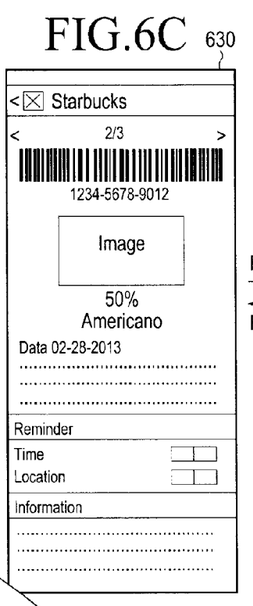
Figure 6D:
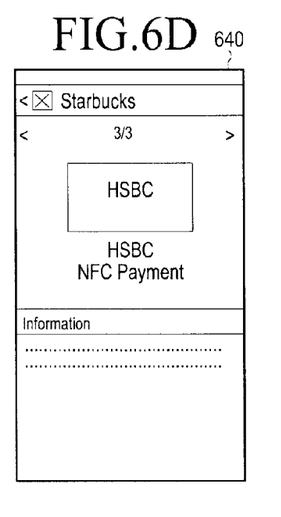

FIG. 5 is a flowchart of yet another example of a process for providing a user interface. In step 500, the processor 100 displays a plurality of payment items on the screen in response to a payment request. In step 501, one or more payment items are selected by a user.

In step 502, the processor 100 generates payment pages corresponding to the selected payment items. In some implementations, each of the payment pages may include information (e.g., a scannable item) corresponding to different one of the selected payment items. Additionally, or alternatively, in some implementations, at least one of the payment pages may include detailed information corresponding to multiple payment items. For example, one such page may include information related to a credit card, a membership card, or a coupon. Additionally or alternatively, each of the group pages may be associated with an ID of the user of the electronic apparatus 10.

In step 503, the processor 100 displays one of the generated payment pages on the display unit 130.

In step 504, the scanning apparatus 20 scans a barcode included in the displayed payment page.

In step 505, the processor 100 determines whether it is requested to display another payment page. The request to display another payment page may be provided to the electronic apparatus 10 via any suitable input means, such as a touch input, key input, etc. In some examples, the input may include a drag in a horizontal direction. Additionally or alternatively, the request to display another payment page may be provided by moving the scanning apparatus 20 in front of the camera unit 110. For example, the processor 100 may recognize a movement of the scanning apparatus 20 based on images captured by the camera unit 110 and identify the recognized movement of the scanning apparatus 20 as a request to display another payment page.

If it is requested to display another payment page, the process proceeds to step 506. Otherwise, if no request to display another payment page is detected, the process proceeds to step 507.

In step 506, the processor displays another payment page. In step 507, the processor 100 determines whether the payment is completed. If the payment is completed, the processor 100 displays a payment completion screen on the display unit 130 in step 508. If the payment is not completed, step 507 is repeated.

FIGS. 6A to 6D are diagrams illustrating another example of a user interface according to aspects of the present disclosure. According to the example, a screen 610 may be displayed identifying various groups of payment items. After the list 610 is displayed, a user input (e.g., a touch input) may be received selecting one of the groups in the list.

In response to the input, the processor may generate and display a payment page 620 for one of the items in the selected group. In some implementations, the generation of the payment item page 620 may include capturing one or more images of a scanning device (e.g., scanning apparatus 20) that is located within sight of the camera unit 110 and recognizing a kind of the payment device (e.g., a barcode reader, an NFC reader, etc.). Then, the processor 100 may generate (or obtain) a scannable item compatible with the scanning apparatus 20 and embed (or otherwise associate) the scannable item into the payment page. For example, if the scanning apparatus is recognized as a barcode reader, the processor 100 may embed (or otherwise associate) a barcode with the payment page, as shown with respect to payment page 620. As another example, if the scanning apparatus is recognized as an NFC reader, the processor 100 may embed (or otherwise associate) an NFC tag with the payment page, as shown with respect to payment page 640.

After the payment page 620 is displayed, if it is requested to display another payment page, the processor 100 may display a payment page 630. If it is requested to display still another payment page, the processor 100 may display the payment page 640.

As discussed above, the processor 100 can recognize a movement of the scanning apparatus 20 based on images captured by the camera unit 110, and if the recognized movement of the scanning apparatus 20 is a movement in a horizontal direction (or another type of predetermined movement), the processor 100 can treat that movement as a request to display another payment page. Additionally or alternatively, in some implementations, the processor 100 may recognize a movement of a hand of a human through the camera unit 110 and treat the recognized movement as a request to display another payment page.

Figure 7:
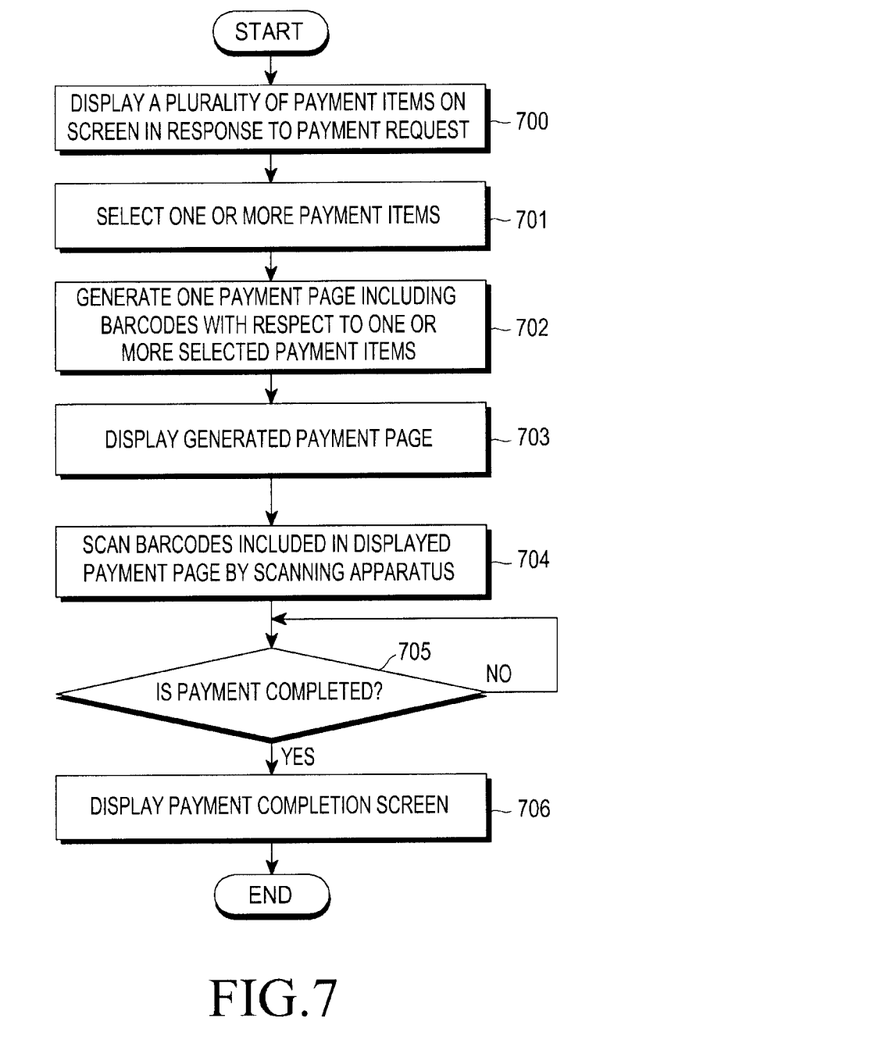
FIG. 7 is a flowchart of yet another example of a process for providing a user interface according to aspects of the disclosure.

FIG. 7 is a flowchart of yet another example of a process for providing a user interface according to aspects of the disclosure. In step 700, the processor 100 displays a plurality of payment items according to a payment request. In step 701, one or more payment items are selected. In step 702, the processor 100 generates a payment page including one or more barcodes associated with the one or more selected payment items. For example, the processor 100 can generate a payment page including a barcode for a credit card, a barcode for a membership card, and a barcode for a coupon.

In step 703, the processor 100 displays the generated payment page on the display unit 130. In step 704, the scanning apparatus 20 scans the one or more barcodes included in the displayed payment page. In step 705, the processor 100 determines whether the payment is completed. If the payment is completed, the processor 100 displays a completion screen, on the display unit 130, in step 706. Otherwise, if the payment is not completed, step 705 is repeated.

Figure 8A:
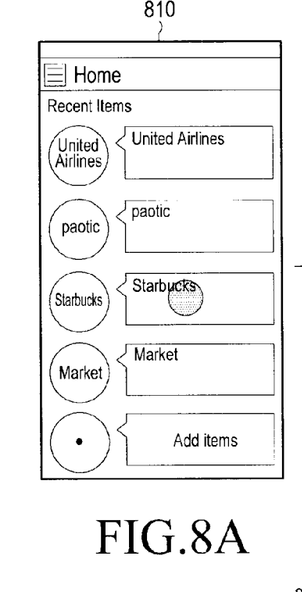
FIG. 8A and FIG. 8B are diagrams illustrating yet another example of a user interface according to aspects of the present disclosure.
Figure 8B:
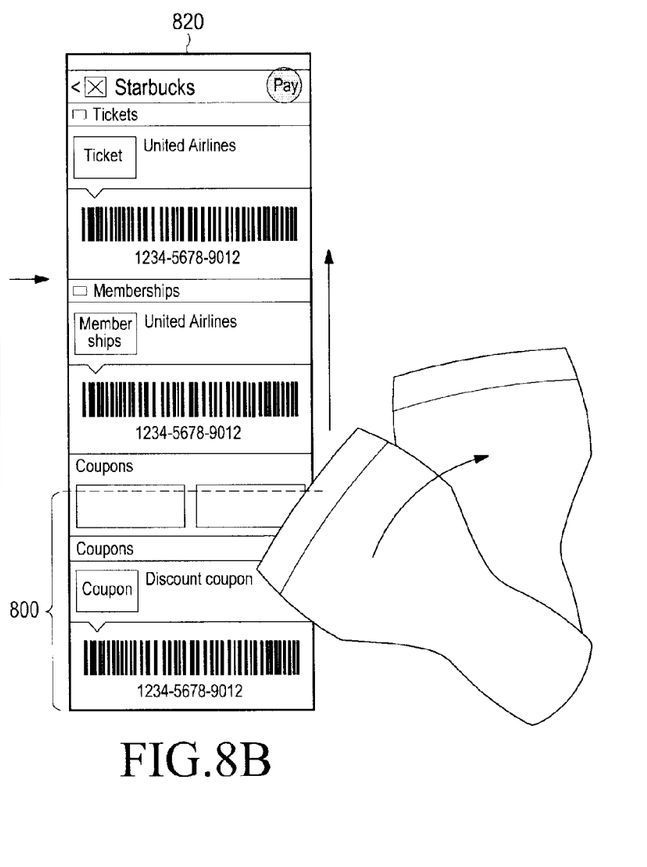

FIGS. 8A and 8B are diagrams illustrating yet another example of a user interface according to aspects of the present disclosure. According to the example, as shown in FIG. 8A, a list 810 identifying various groups of payment items may be displayed. When an input 812 is received selecting one of the groups, the processor 100 can generate a payment screen 820 associated with the selected group. Afterwards, the processor 100 can display the payment screen on the display unit 130 as shown in FIG. 8B.

For example, when the size of the payment screen is larger than the size of the display unit 130, the processor 100 can scroll the payment screen 820 based on gestures performed with the scanning apparatus 20, as shown in FIG. 8B. More specifically, the processor 100 can detect a movement of the scanning apparatus 20 through the camera unit 110. If it is determined that the detected movement of the scanning apparatus 20 corresponds to a request for scrolling the payment screen 820, the processor 100 can fulfill the request and scroll the screen.

In this regard, according to various embodiments of the present disclosure, it is possible to reduce time consumed in payment by providing a payment screen including payment items selected by the user among various payment items and to provide a user with faster and easier payment.

Although the above examples are provided in relation to payment transactions, it should be noted that the above interface may be used in any transaction in which scanning of codes is performed. Furthermore, it should be noted that FIGS. 2, 3, 5, and 7 are provided as examples only. At least some of the steps provided in these figures can be performed in a different order, performed concurrently or altogether omitted.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Further, the electronic device may receive the program from a program providing apparatus connected to the electronic device wirelessly or through a wire and store the received program. The program providing apparatus may include a program that includes instructions to cause the electronic apparatus to perform a payment screen displaying method, a memory that stores information required for the payment screen displaying method, and the like, a communication unit that performs wired or wireless communication with the electronic apparatus, and a controller that performs a control to transmit a corresponding program to the electronic apparatus automatically or under a request of the electronic apparatus.

Although specific aspects are described in the above description of the present disclosure, various modifications can be made without departing from the scope of the present disclosure. Accordingly, the scope of the present disclosure shall not be determined by the above-described aspects, and is to be determined by the following claims and their equivalents.

What is claimed is:

1. An apparatus comprising: a display unit; a camera; and at least one processor configured to: capture an image of a scanning device by using the camera; detect an orientation of the scanning device relative to the display unit; and output a first scannable item by rotating the first scannable item based on the orientation of the scanning device relative to the display unit.

2. The apparatus of claim 1, wherein the first scannable item includes at least one of a credit card identifier, a mobile payment identifier, a membership card identifier, a coupon identifier, and a ticket identifier.

3. The apparatus of claim 1, wherein: the processor is further configured to generate a page including the first scannable item; and display the generated page on the display unit.

4. The apparatus of claim 1, wherein the first scannable item includes a barcode.

5. The apparatus of claim 1, wherein: the processor is further configured to detect a position of the scanning device relative to the display unit; and display the first scannable item at a location in the display unit that is selected based on the position of the scanning device relative to the display unit.

6. The apparatus of claim 1, wherein processor is configured to display a second scannable item concurrently with the first scannable item.

7. An apparatus comprising: a camera; and at least one processor configured to: display a first scannable item; capture an image of a scanning device by using the camera; detect a motion of the scanning device based on the captured image of the scanning device; and remove the first scannable item from display based on the detected motion of the scanning device and display a second scannable item.

8. A method comprising: capturing, by an electronic device, an image of a scanning device; and detecting an orientation of the scanning device relative to a display unit of the electronic device; and outputting, by the electronic device, a first scannable item by rotating the first scannable item based on the orientation of the scanning device relative to the display unit.

9. The method of claim 8, wherein the first scannable item includes at least one of a credit card identifier, a mobile payment identifier, a membership card identifier, a coupon identifier, and a ticket identifier.

10. The method of claim 8, further comprising generating a page including the first scannable item, displaying the generated page.

11. The apparatus of claim 8, wherein the first scannable item includes a barcode.

12. The method of claim 8, further comprising: detecting, by the electronic device, a position of the scanning device relative to a display screen of the electronic device; displaying, by the electronic device, the first scannable item at a location in the display screen that is selected based on the position of the scanning device relative to the display screen.

13. The method of claim 8, further comprising: displaying a second scannable item concurrently with the first scannable item.

14. A method comprising: displaying, by an electronic device, a first scannable item; capturing an image of a scanning device by using a camera; detecting, by the electronic device, a motion of the scanning device based on the captured image of the scanning device; removing the first scannable item from display based on the detected motion of the scanning device and displaying a second scannable item.

15. An apparatus comprising: a camera; a display unit; and at least one processor configured to: generate at least one payment item group including at least one payment item corresponding to a specific place; control the display unit to display the generated at least one payment item group; and capture an image of a scanning device by using the camera; detect an orientation of the scanning device relative to the display unit; and in response to a selection of one of the payment items in the group, control the display unit to display a scannable item corresponding to the selected one of the payment items by rotating the scannable item based on the orientation of the scanning device relative to the display unit.

16. The apparatus of claim 15, wherein the at least one payment item comprises at least one of a credit card identifier, a mobile payment identifier, a membership card, a coupon identifier, and a ticket identifier.

\* \* \* \* \*